June 21, 1960  A. D. PINOTTI  2,941,335
FURNACE FOR GLASS FEEDING AND CONDITIONING
Filed Aug. 28, 1956  4 Sheets-Sheet 4
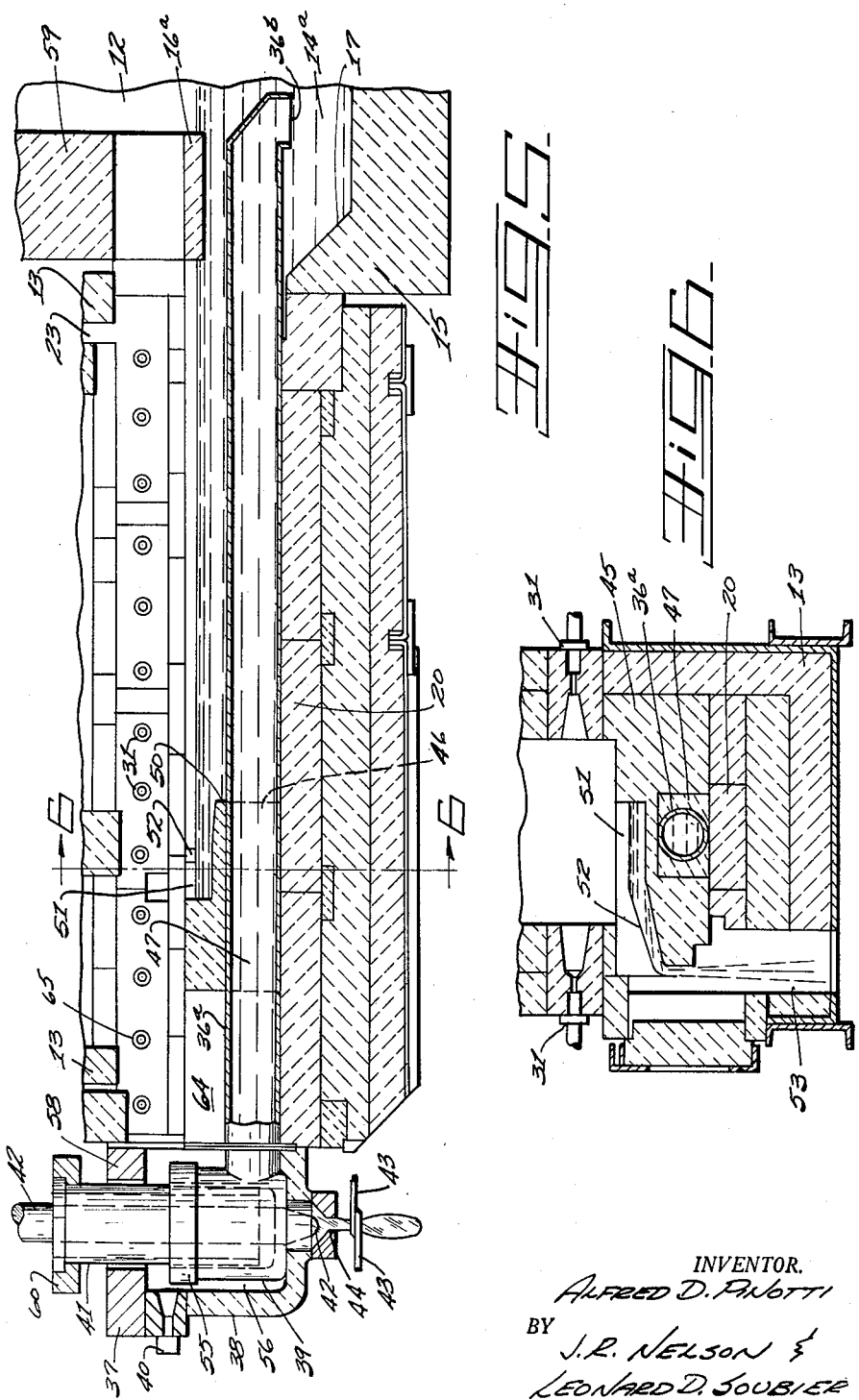
INVENTOR.
ALFRED D. PINOTTI
BY J. R. NELSON &
LEONARD D. SOUBIER
ATTORNEYS

United States Patent Office 2,941,335
Patented June 21, 1960

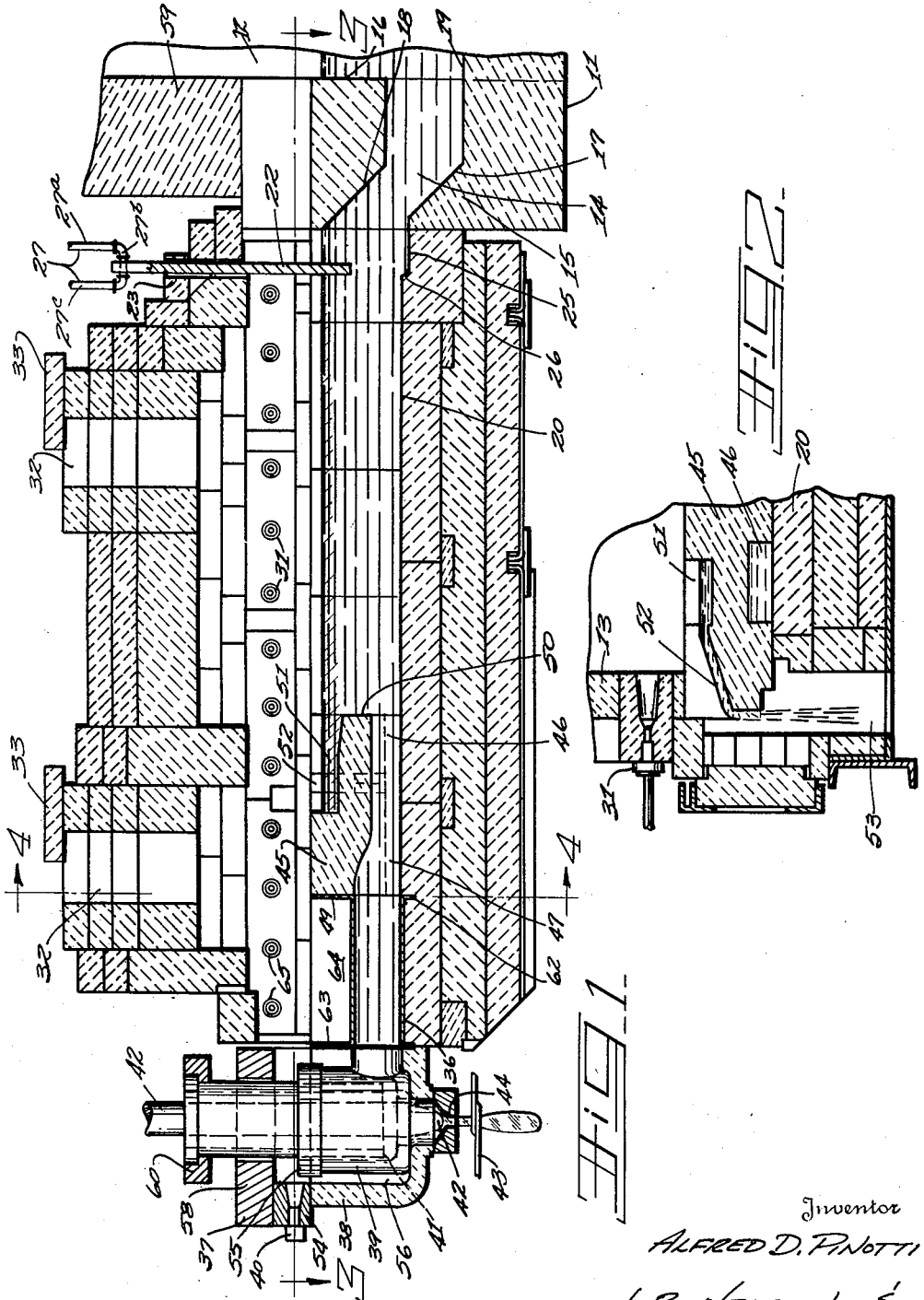

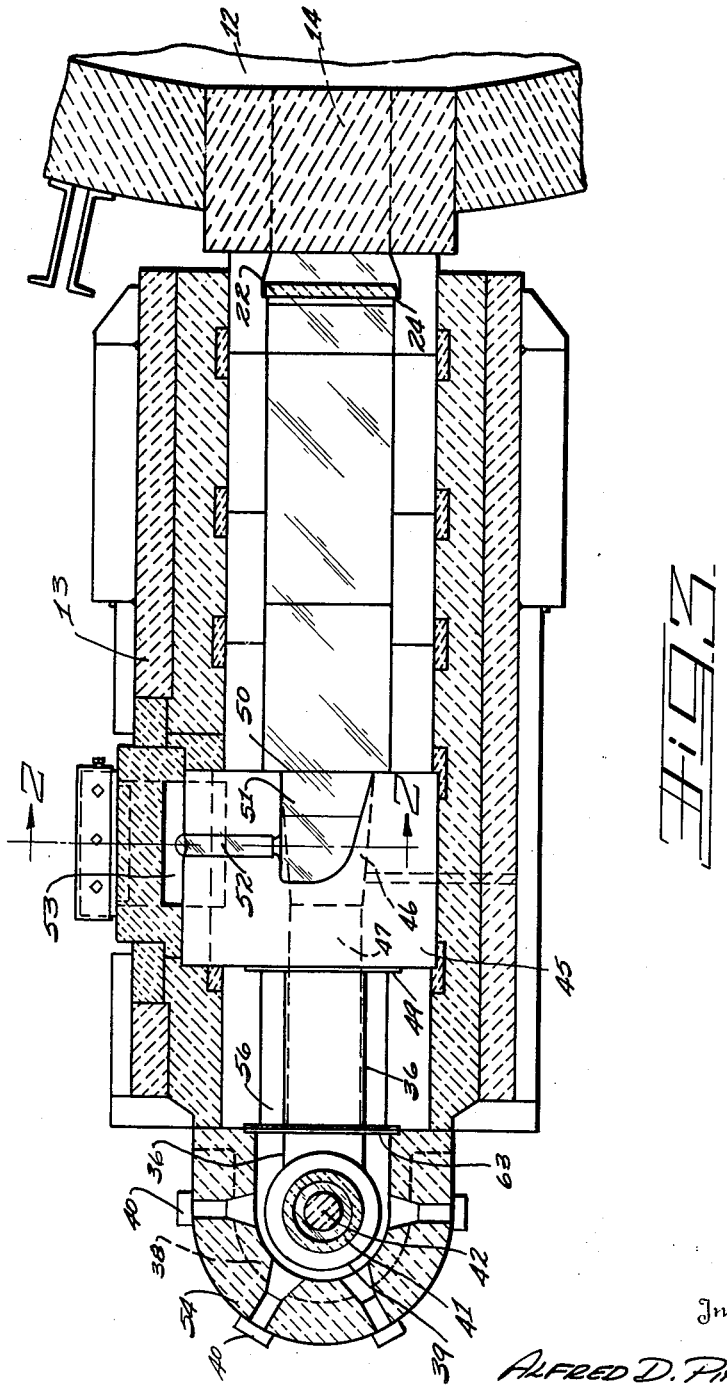

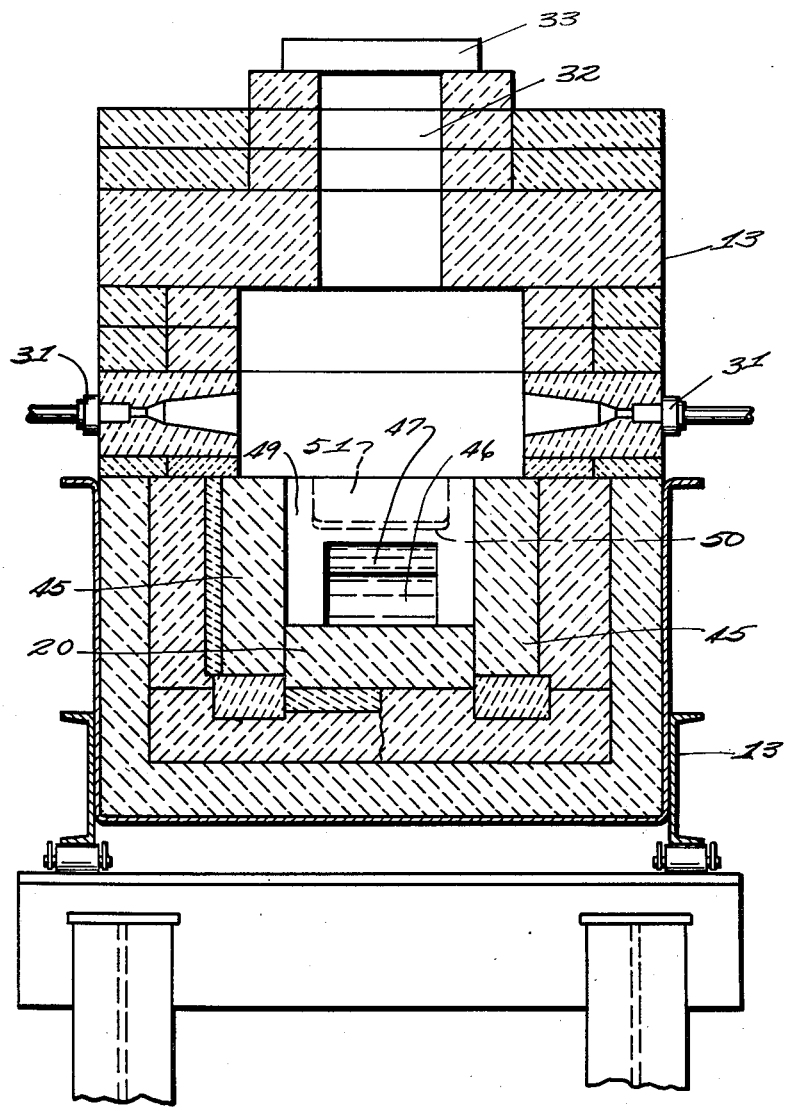

2,941,335

FURNACE FOR GLASS FEEDING AND CONDITIONING

Alfred D. Pinotti, Toledo, Ohio, assignor to Owens-Illinois Glass Company, a corporation of Ohio Filed Aug. 28, 1956, Ser. No. 606,665

8 Claims. (Cl. 49—55)

This invention relates to apparatus for glass feeding. More specifically, the invention employs new and useful improvements in apparatus for withdrawing molten glass from a glass refiner and delivering it to a glassware forming machine for blowing, pressing, or drawing operations. Although the present invention is applicable to glass feeding generally, it is of particular importance when applied to the manufacture of borosilicate glass products.

In feeding molten glass from a furnace, for example, into a glass forming machine, it is necessary for efficiently forming glassware to control the temperature of the glass during the feeding operation, so that the glass will be at the desired temperature at the time it is fed to the point of formation, i.e. controlled rate of cooling the glass from the point it leaves the refiner to the point of forming. Also, to produce satisfactory ware of any type, it is necessary to feed to the point of formation a glass that is free of impurities and substances foreign to the desired glass composition.

In producing glassware from a borosilicate glass composition, glass must normally be withdrawn from the refiner at temperatures sufficiently high so that, after it has passed through a conventional forehearth section and spout, it is brought to the discharge point at temperatures in the range of 2,450–2,700° F. The rate of cooling has been heretofore controlled by radiation and impingement firing directly onto the surface of the glass in the forehearth and in the spout. The characteristic high temperature feed conditions necessary at the beginning of the forming operations present two distinct problems, namely: (1) Where glass is fed to the point of formation at these temperatures, the flow of molten glass at higher temperatures from the refiner to the point of discharge will tend to break down the refractory linings along the flow route. The erosive action at these temperatures allow refractory particles of the feed channel to mix with the good glass, resulting in the production of a non-homogeneous composition of glass. (2) Loss of volatile ingredients in the molten glass causes the formation of high silica glass of a non-homogeneous nature on the surface of the borosilicate glass matrix in the forehearth, and if so delivered will cause the production of glass of non-homogeneous composition.

Accordingly, the important objects of the present invention are:

(1) To provide apparatus for feeding glass that is free of impurities by removing impurities formed on the surface of the glass in the forehearth without interrupting the flow of good glass to the discharge point.

(2) To provide apparatus for feeding glass through the later stages of a feeder passage which is not readily susceptible to erosive wear under the flow of high temperature fluids.

(3) To provide an apparatus for efficiently controlling the rate of cooling of the glass during feeding by feeding it through an enclosed feeding system and radially heating the glass while it is flowing therein.

The specific nature of this invention, as well as other objects and advantages thereof, will become apparent to those skilled in the art from the following detailed description, taken in conjunction with the annexed sheets of drawings, on which, by way of preferred example only, are illustrated two embodiments of this invention.

As a specific illustration of the utilization of the invention, it is shown and described hereinafter as being applied to a device for the feeding of charges of molten glass to a forming machine. However, let it be understood that this same feeding device may be utilized to feed a continuous stream of this segregated molten glass to a tube or rod forming mandrel or to a delivery point for forming sheet or other forms of glass.

Fig. 1 is a vertical sectional view taken longitudinally through the center of a glass furnace showing the improved apparatus of the first embodiment of the invention.

Fig. 2 is an enlarged vertical sectional view taken along line 2—2 of Fig. 3, showing the skimmer for removing surface glass impurities in forehearth.

Fig. 3 is a sectional plan view taken along line 3—3 of Fig. 1.

Fig. 4 is a front sectional view taken along line 4—4 of Fig. 1.

Fig. 5 is a vertical sectional view, similar to Fig. 1, showing the second embodiment of the invention.

Fig. 6 is an enlarged sectional view taken along line 6—6 of Fig. 5.

Referring to Fig. 1, the glass furnace 11, constructed of the usual refractory material, is provided with a refiner 12, partially shown, and an enclosed forehearth 13. Molten glass is withdrawn under force of gravity from the glass body in refiner 12 through an upwardly inclined feed passage 14, which is located below the surface of that body of glass. Feed passage 14 is formed by lower block 15 and skimmer block 16 set into the forward refractory wall of refiner 12. Lower block 15, beginning flush with floor 19 of refiner 12, is inclined upwardly along surface 17 to a point slightly below the level of floor 20 of forehearth 13. Skimmer block 16, beginning adjacent the rear of forehearth 13, is inclined downwardly along the surface 18 which lies substantially parallel to inclined surface 17.

Impurities found on the surface of the glass in refiner 12 are prevented from entering forehearth 13 by skimmer block 16. Glass is withdrawn from the refiner near the vertical mid-portion of the body of glass.

Impurities that are heavier than the glass composition tend to settle to the floor 19 of refiner 12, and due to the upward inclination of feed passage 14, these impurities remain in the refiner.

A metal flow gate 22 is constructed of a suitable alloy, and is sheathed with a platinum-rhodium alloy. It is inserted through a corresponding vertical slot 23 through the refractory at the top of forehearth 13. Gate 22 extends vertically into forehearth 13 and bears against vertical shoulders 24 (Fig. 3), and is adjustable up or down for either varying the rate of or closing off the flow of glass into forehearth 13. The rear of the floor 20 of forehearth 13 has a lateral depression 25 across the entrance of feed passage 14 which joins with inclined surface 17. The depression 25 forms a shoulder 26 below the level of floor 20, and is in line vertically with shoulders 24 so that, when gate 22 is lowered to close said passage 14, the lower forward edge of gate 22 will will bear against bottom shoulder 26.

Gate 22 is supported by a metal support member 27 consisting of a pipe 27a spaced from gate 22 and parallel to its vertical plane. Pipe 27a is connected to a U-joint section 27b, which is inserted through a bore in the upper portion of gate 22 at right angles to pipe 27a. Pipe 27c is connected to the other side of section 27b and is parallel to pipe 27a. Support member 27 provides a means for supporting gate 22, as well as a means for adjusting the vertical position of said gate opened and closed either manually or by a conventional power operated hoist (not shown).

Support member 27 is liquid-cooled by circulating a coolant through support member 27 to prevent it from fusing with the metal in the bore of gate 22 under the characteristic high operating temperatures existing at the rear of the forehearth.

Gas-fired burners 31 are mounted in both side walls of forehearth 13 in burner blocks 21 (Fig. 4) above the level of the glass. Burners 31 have fuel supplied to them and are controlled by a conventional thermostatic control mechanism for increasing or decreasing the fuel supplied. In Fig. 1, vents 32 are built into the roof of forehearth 13, and provide a means to expel gases formed in forehearth 13. Damper covers 33 fit over the tops of vents 32 to regulate the vent opening.

Referring to Figs. 1 and 3, one of the novel features of the present invention will now be described.

A tube 36, which is later described herein in detail, connects forehearth 13 to a feed spout 39 of feed spout assembly 37. Spout assembly 37 is mounted adjacent the front side of forehearth 13. Spout assembly 37 is comprised of a refractory jacket 38, burner blocks 54 which house burners 40, cover 58, feed spout 39 and cover 55 for spout 39. Spout 39 is cast from a platinum-rhodium alloy. Jacket 38 has a plurality of gas-fired burners 40 placed around its periphery for applying heat to spout 39. Burners 40 are thermostatically controlled by conventional control mechanism for controlling the temperature of the glass contained in spout 39. In the conventional spout used heretofore, the burners are impingement fired directly onto the surface of the glass contained in the spout. This method has certain disadvantages, in that, the temperature of the glass is not stabilized and may not be efficiently controlled uniformly, heat is not efficiently applied, and the surface of the glass in the spout is susceptible to formation of impurities from the products of combustion, oxidation, reduction, etc. In the present invention, these disadvantages are remedied by having the spout 39 cast as a separate element of the aforementioned alloy, and spaced from jacket 38 to form a heat chamber 56. In this manner, burners 40 furnish heat to the outer surface of the spout through chamber 56, and thus provide a more accurate and efficient way of controlling the temperature of the glass extruded at orifice 44. In this way, the glass in spout 39 is not exposed directly to the fire of the burner, and hence, the formation of the aforementioned impurities is prevented.

A hollow cylindrical sleeve 41 is inserted inside spout 39, its outer diameter being spaced from the inner diameter of spout 39 (Fig. 3). Sleeve 41 is journaled in platinum-rhodium alloy cover plate 55, which fits over the top of spout 39 (Fig. 1). Sleeve 41 projects above cover plate 55, fits through an opening in cover 58 of refractory jacket 38 and projects above said cover to engage a conventional rotary drive mechanism (not shown) at drive assembly 60, mounted at the upper end of sleeve 41. Sleeve 41 is continuously rotated by said rotary drive mechanism. As is well known in glass feeding practice, the rotating sleeve 41 and a vertically reciprocable needle 42 (described below) constitute a means for controlling the issuance of molten glass from spout 39 through its orifice 44.

Needle 42 is vertically reciprocated in spout 39 in timed relationship to the motion of shears 43 (shown schematically). Needle 42 and shears 43 are actuated by mechanism of the type shown and described in U.S. Patent No. 1,631,107, to K. E. Peiler, for "Feeding Molten Glass." For each charge of glass fed past orifice 44 and severed by shears 43, needle 42 makes one complete up-and-down stroke.

The desired temperature at which the glass is fed through orifice 44 is controlled by controlling the amount of cooling of the glass during feeding. This is accomplished by controlling the heat supplied to the glass by burners 31 and 65 in forehearth 13 and burners 40 in spout assembly 37.

Turning now to Figs. 3 and 4, another novel feature of the invention will now be described. The forward refractory wall 45 of forehearth 13 has a delivery port 46 in delivery outlet 47 formed in wall 45. Outlet 47 is connected to tube 36 by a flange 49. Tube 36 passes through an opening in plate 63 and makes a fluid-tight connection with spout 39. Accordingly, port 46, outlet 47 and tube 36 form a continuous duct for the flow of molten glass from forehearth 13 into spout 39.

The sidewalls of delivery outlet 47 taper laterally toward its outer end to register with the inside diameter of tube 36 to form a continuous fluid-tight duct. Tube 36 is constructed of a metal alloy, preferably a platinum-rhodium alloy, and is held in place by flange 49 fastened to the outside of forehearth wall 45. The lower portion of flange 49 is inserted into the refractory floor 20 at slot 62 (Fig. 1). The refractory jacket 38 for spout 39 is rigidly attached to the front end of forehearth 13 (Fig. 2). Tube 36 projects through a metal plate 63. Metal plate 63 forms an outer fire wall for forehearth 13, which also encloses the rear end of heat chamber 56, and serves as a support member for tube 36. A second heat chamber 64 is formed in the forward end of forehearth 13, between the outside of wall 45 and metal plate 63. A set of burners 65 supply heat to chamber 64. The heat furnished to chamber 64 will serve to control the temperature of the glass while in the portion of tube 36 lying within said chamber. Heat supplied to chamber 56 surrounding spout 39, will serve to control the temperature of the glass while in that portion of the system.

Thus, it is seen that the present invention provides a novel platinum-rhodium alloy independently enclosed feed passageway extending from the forehearth to the spout discharge orifice, wherein the rate of cooling of the glass at this later stage of feeding is controlled by applying heat to the outer peripheral surfaces of this platinum-rhodium alloy enclosed feed passage.

In Figs. 1–3 is shown surface skimmer dam 50, which constitutes another of the novel features of the present invention. Skimmer dam 50 is formed at the inner surface of the refractory of wall 45 of forehearth 13. Skimmer chamber 51 is formed out of the refractory of the forward wall 45 of the forehearth and extends vertically from below the normal surface level of the body of glass in forehearth 13 to a point above said level. It extends outwardly of forehearth 13 into wall 45, and is located centrally of the forehearth channel above dischage outlet 46 (Figs. 1 and 2). A drain passage 52, which is inclined downwardly to one side of the forehearth, connects the outer side of skimmer passage 51 to a vertical discharge chamber 53 (Fig. 2).

In Fig. 2, passage 51 is shown partially filled with glass skimmed from the surface layer of the body of glass in forehearth 13. This glass flows along drain passage 52 into discharge chamber 53. Chamber 53 terminates in a tank (not shown) of any convenient form, which is preferably partially filled with water to receive and solidify the skimmed layer of glass.

In operation of the present invention, glass is withdrawn from the refiner near the mid-portion of the supply body through inclined passage 14 and fed into the main channel of forehearth 13. Inclined passage 14 and the main channel of forehearth 13 comprise a continuous passageway for the flow of a submerged layer of glass from the supply body to delivery port 46. The normal level of the glass contained in forehearth 13 extends above skimmer dam 50. As glass flows from the refiner into the forehearth, it begins to cool. By controlling the heat supplied in the forehearth by burners 31 the rate of cooling of the glass in forehearth 13 is regulated.

In producing borosilicate glassware, the surface layer of glass in the forehearth is subjected to loss of volatile ingredients in the molten glass, causing a non-homogeneous layer of high silicate glass to form on the matrix of the forehearth. By having skimmer dam 50 below the normal level of glass in the forehearth, a surface layer of glass containing this high silica glass will flow over skimmer dam 50 into skimmer chamber 51 and be discharged from the forehearth through drain passage 52 and discharge chamber 53.

The good glass is withdrawn at the lower strata in forehearth 13 at delivery port 46 and passed through outlet 47, tube 36, and into spout 39 to fill it to the level of the supply body in the refiner. Tube 36 and spout 39 are totally enclosed, and the rate of cooling the glass contained therein is controlled by applying heat to the exterior of spout 39, enclosed by jacket 38, and tube 36 through burners 65 and 40. Glass in spout 39 is continuously discharged at orifice 44, and shears 43 periodically sever gobs of the glass from the extruded column to supply mold charges to a parison mold of a glass forming machine.

It is seen that, through the process of withdrawing a submerged layer of glass from the mid-portion of the supply body, passing it through the forehearth still submerged in the glass therein, then through an enclosed duct and into an enclosed spout, the latter two elements each having heat applied to their respective outer surfaces, the thus fed glass is carried through a conditioning section under controlled conditions of cooling, and issued from the spout with a minimum of heat loss.

Referring to Figs. 5 and 6, the second form of the invention will now be described.

The arrangement of refiner 12, forehearth 13, surface skimmer 50, and spout assembly 37 is the same as shown and described for Figs. 1-4.

In this second embodiment, a platinum-rhodium alloy tube 36a extends longitudinally along the floor 20 of forehearth 13 and into a feed passage 14a formed by lower inclined block 15 and upper skimmer block 16a in wall 59 of the refiner. Feed passage 14a is inclined on its lower longitudinal surface 17 only, the upper surface being above the glass level in refiner 12. In its plan view, the modified feed passage 14a of this second embodiment is the same as shown in Fig. 3 for feed passage 14 of the first embodiment. Near the end of tube 36a, it is inclined downwardly terminating at its end opening 36b facing downwardly into the supply body of glass G being drawn into feed passage 14a. Tube 36a extends longitudinally along the floor 20 of forehearth 13, and passes through delivery port 46, delivery outlet 47, and is joined with spout 39 at its other end. The outer portion of delivery outlet 47 provides a fluid-tight fit with tube 36a. Thus, the only outlet for the flow of glass out of the lower channel portion of forehearth 13 is through tube 36a.

The major modifications of this, the second embodiment of the invention, over the first embodiment, are therefore: (1) the modified feed passage 14a between the refiner 12 and forehearth 13 for housing the inlet of the elongated tube 36a, and (2) the modified tube 36a, which is elongated to extend rearwardly through deliverey outlet 47, port 46, along the length of the main channel in forehearth 13 and into feed passage 14a.

It should be understood that the length of the platinum-rhodium tube 36 or 36a may be modified, such as, between the limits shown in Figs. 1 and 5, without departing from the spirit of this invention.

In operation of the invention by utilizing the apparatus shown in Figs. 5 and 6, glass is withdrawn from the supply body at feed passage 14a. A portion of this glass enters opening 36b of tube 36a and passes through forehearth 13 in tube 36a. It then flows into spout 39 of spout assembly 37. The outer surfaces of tube 36a and spout 39 are heated in chambers 64 and 56, respectively.

The remainder of the glass withdrawn at passage 14a flows into the main channel of forehearth 13, submersing that portion of tube 36a extending into said chanel in molten glass. The glass on the outside of tube 36a is heated by burners 40. Tube 36a serves as a heat exchange passage between the glass surrounding it and the glass passing therethrough, the glass surrounding tube 36a acting as a heat retaining blanket for the glass in tube 36a.

The normal level of glass contained in forehearth 13 extends above the level of skimmer dam 50, and hence, a surface layer containing any non-homogeneous glass composition passes over it, into skimmer chamber 51 and discharged from forehearth 13 through drain passage 52 in the same manner as described for the first embodiment of the invention.

The first embodiment of the invention, as shown and described for Figs. 1-4, is the preferred construction.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. A glass feeding apparatus comprising, in combination: a forehearth channel adapted to receive and contain a normal operating level of molten glass therein, an enclosed delivery passageway extending outwardly from the outer end portion of the channel, said passageway comprising a platinum rhodium alloy duct making a fluid-tight connection with said end portion of said channel and terminating in a feed spout assembly having a platinum rhodium alloy spout for containing molten glass, an orifice at the bottom of said spout, said duct and spout forming an independently enclosed passageway for flow of glass to its point of delivery at said orifice, a jacket around the spout and in spaced relationship to its sides and top to form a heating chamber around its exterior surfaces, first heater means adapted to supply heat to the heating chamber for controlling the temperature of the glass contained in the spout, and second heater means adapted to supply heat etxernally to said duct for controlling temperature of the glass therein.

2. In a glass furnace wherein molten glass is refined in a refining chamber and conveyed for deliver through an elongated, horizontally disposed forehearth channel, the channel being connected at its inner end to the refiner at a submerged outlet from the latter, the combination therewith of: a feeder spout having an interior surface of an alloy of a noble metal, a delivery orifice near the bottom of said spout, means in the outer end of the forehearth channel for restricting the flow of glass and defining a submerged outlet therefrom, said means permitting only the lower layer of glass in the latter to flow through said outlet, means providing an outwardly extending connection for conveying molten glass from said outlet of the forehearth to the feeder spout, refractory means in spaced relationship and enclosing said feeder spout, thereby defining a chamber about the exterior of said feeder spout, and means for supplying heat to said chamber.

3. The apparatus defined in claim 2, wherein said means providing the connection from the forehearth to the feeder spout comprises a cylindrical duct having an interior surface of an alloy of a noble metal, and included additional is a refractory enclosure for said duct between the forehearth and the feeder spout and in spaced relationship to said duct to define a chamber, and means for supplying heat to said last-mentioned chamber.

4. The apparatus defined in claim 3, wherein the cylindrical duct is supported by the outer end of the forehearth, one end of said duct being connected to receive glass from the outer end of the forehearth channel and the other end of said duct being connected with and opening into the feeder spout.

5. The apparatus defined in claim 3, wherein the cylindrical duct extends inwardly through the outer end of the forehearth and along the bottom of said forehearth to receive molten glass at one end of the duct and segregate the glass in the forehearth into two separate bodies, said received glass being the body of working glass, and the other end of said duct being connected with and opening into the feeder spout.

6. In a glass furnace wherein molten glass is refined in a refining chamber and thereafter conditioned and fed for forming, the combination therewith of: a forehearth, means connecting one end of the forehearth with the lower level of the refining chamber and adapted to receive glass from the refining chamber at the lower layer therein, means in the other end of the forehearth for restricting the flow of glass and defining an outlet therefrom, said means permitting only the lower layer of glass in the latter to flow through said outlet, a feeder spout, a delivery orifice near the bottom of said spout, duct means projecting outwardly from the restricting means of the forehearth and communicating with both the forehearth outlet and the feeder spout, jacket means enclosing said feeder spout and in spaced relation thereto defining a chamber, and first means for supplying heat to said chamber and second means for supplying heat externally to said duct means.

7. A glass feeding device comprising a forehearth channel adapted to convey molten glass, the entrance and exit openings for said channel being provided at points submerged beneath the normal operating level for the glass, a feed spout adapted to contain and deliver molten glass, a metal alloy duct connected from said channel to said feed spout, said feed spout comprising: an enclosed metal alloy bowl connected with the metal alloy duct to receive molten glass from said duct, said bowl having a delivery orifice at its bottom for feeding glass, a jacket surrounding the bowl and spaced therefrom to form a chamber around the outer surface of the bowl, and heater means operatively connected for supplying heat to said chamber for controlling the temperature of the glass contained in the bowl.

8. In a glass feeding device according to claim 7, characterized by the fact that the metal alloy comprises an alloy of platinum-rhodium.

References Cited in the file of this patent

UNITED STATES PATENTS

| | | |
|---|---|---|
| 970,633 | Mambourg et al. | Sept. 20, 1910 |
| 1,138,111 | Howard | May 4, 1915 |
| 1,818,203 | Drake | Aug. 11, 1931 |
| 1,872,477 | Mambourg | Aug. 16, 1932 |
| 2,053,381 | Stewart | Sept. 8, 1936 |
| 2,310,715 | Soubier | Feb. 9, 1943 |
| 2,688,469 | Hohmann | Sept. 7, 1954 |

FOREIGN PATENTS

| | | |
|---|---|---|
| 1,115,986 | France | Jan. 23, 1956 |